Sept. 2, 1930.    I. R. HIPPENMEYER    1,775,029
INTERMITTENT DRIVE FOR ENDLESS CONVEYERS
Filed July 13, 1929
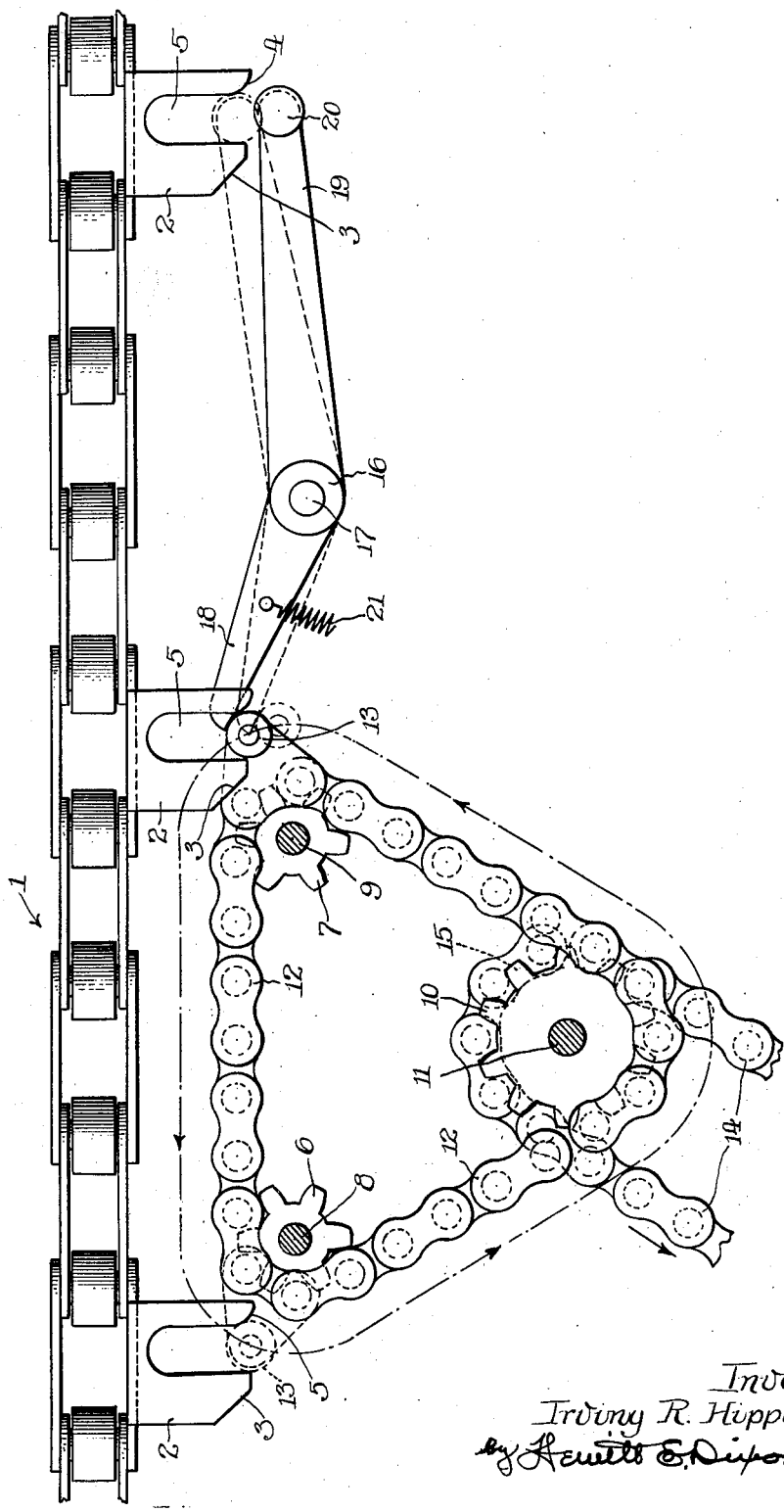

Patented Sept. 2, 1930

1,775,029

UNITED STATES PATENT OFFICE

IRVING R. HIPPENMEYER, OF WAUKESHA, WISCONSIN, ASSIGNOR TO THE CREAMERY PACKAGE MFG. COMPANY, OF CHICAGO, ILLINOIS, A CORPORATION OF ILLINOIS

INTERMITTENT DRIVE FOR ENDLESS CONVEYERS

Application filed July 13, 1929. Serial No. 377,944.

The invention relates to driving mechanism for actuating an endless conveyer with intermittent movement, and especially relates to such mechanism as employed with the conveyers in machines for washing milk containers.

In such machines, the containers carried by the conveyer are moved into successive positions of rest whereat the containers are subjected to cleansing operations which require for efficiency that the containers be accurately positioned while at rest over the cleansing devices.

The object of the invention is to provide intermittent driving mechanism for such conveyers which operates to advance the conveyer a uniformly equal distance with each movement, which gradually accelerates and decelerates the movement of the conveyer at starting and stopping, and which locks the conveyer against movement during its periods of rest.

Other objects and advantages will be apparent in the following detailed description of a preferred embodiment of the invention illustrated in the accompanying drawing.

Referring to the drawing, the reference numeral 1 indicates a portion of a chain belt forming part of an endless conveyer. At regularly spaced intervals on the chain, one of the links is formed with a laterally extending U shaped driving lug 2. One of the arms of the lug is provided with an angularly disposed cam face 3, and the other arm may be endwardly rounded, as at 4, to provide a tapering entry to the slot 5 between the arms.

Positioned adjacent the path of movement of the lugs 2 is a pair of idler sprockets 6 and 7 mounted on shafts 8 and 9 respectively having suitable bearings (not shown). The axes of the shafts 8 and 9 lie in a plane parallel to the path of movement of the lugs 2. A drive sprocket 10, mounted on a shaft 11, having suitable bearings (not shown) carries, with the idler sprockets 6 and 7, a chain driving belt 12. One of the links in the belt 12 is formed to support a laterally extending roller pin 13 which operatively enters the slot 5 in one of the lugs 2 as it approaches the sprocket 7, and as the pin moves from sprocket 7 to sprocket 6 the engaged lug 2 and the conveyer chain 1 are moved with it. In passing around the sprocket 6, the pin 13 is disengaged, and the conveyer chain comes to rest until the pin in its circuit of travel engages the next successive lug and repeats the forward movement. The driving belt 12 is operated continuously by a chain belt 14 operatively connected to a suitable source of power (not shown) and passing over another sprocket 15 mounted on the shaft 11.

The position of rest of the conveyer chain belt 1 is automatically maintained between movements by a locking lever 16 mounted on a stationarily supported pivot 17 and having one arm 18 extending into the path of the roller pin 13 as the latter passes around the sprocket 7. The other arm 19 carries a laterally extending pin 20 which is normally actuated into the path of the lugs 2 by a spring 21 attached to the lever. As the conveyer belt 1 is moved forward, the pin 20 engages the cam face 3 of the approaching lug 2 and is forced outward thereby until the pin passes the end of the lug and snaps back into the slot 5 by action of the spring 21, the last action occurring just as the roller 13 is disengaged from the preceding lug with which it was drivingly engaged. The rest position of the conveyer is thus positively determined and maintained until the roller 13 approaches the next lug 2 positioned before the sprocket 7, whereupon the roller 13 engages the arm 18 and shifts the lever arm 19 to withdraw the pin 20 from the slot 5, the roller 13 then passing into moving engagement with the adjacent lug and with its forward movement releasing the lever 16 for engagement of the pin 20 with the successively following lug.

I claim as my invention:

1. In combination, a conveyer belt having a series of regularly spaced lugs, each of said lugs having a laterally open slot, a driving belt having a portion of its operative run adjacent and parallel to the path of said lugs, and a driving pin mounted on said driving belt and operable into successive engagement with said slotted lugs during its passage through the portion of the run of said driving belt adjacent to said conveyer belt and effective to move said conveyer belt during said engagement a distance equal to the space between centers of said lugs.

2. In combination, a conveyer belt having a series of regularly spaced lugs, a driving belt having a portion of its operative run parallel to the path of said lugs, a driving pin carried by said driving belt and operable into engagement successively with said lugs during successive passages through said parallel portion of the run of said driving belt to move said lugs and said conveyer belt during said engagement, and means for locking said conveyer belt against movement when said pin is disengaged from said lugs, said means being automatically releasable upon engagement of said pin with one of said lugs.

3. In combination, a conveyer belt having a series of regularly spaced lugs, each of said lugs having an open slot, a driving belt having a portion of its operative run adjacent to the path of said lugs, a driving pin carried by said driving belt and operable into successive engagement with said lugs to move said conveyer belt intermittently, a pivoted bar having one end adapted to engage successively said slotted lugs and prevent movement thereof and having the other end extending into the path of movement of said pin at the point of entry of said pin into engagement with said lugs, and resilient means normally maintaining said bar in position for engagement with said lugs.

In witness whereof I have hereunto attached my signature.

IRVING R. HIPPENMEYER.